No. 642,322. Patented Jan. 30, 1900.
F. D. GODDARD.
URN.
(Application filed Sept. 25, 1899.)
(No Model.)
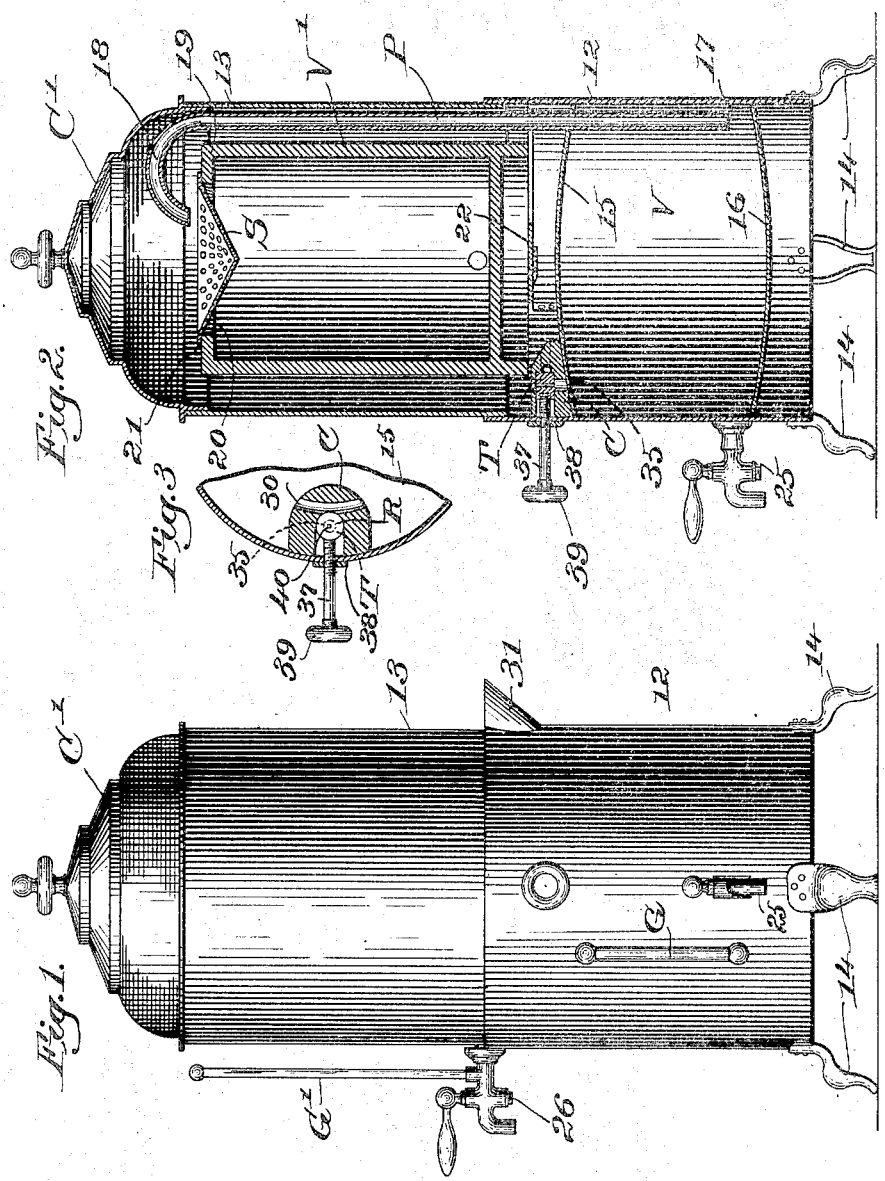
Witnesses.
Thomas J. Drummond.
Adolf Kaiser
Inventor.
Fred D. Goddard,
By Crosby & Gregory
Attys.

UNITED STATES PATENT OFFICE.

FRED D. GODDARD, OF EVERETT, MASSACHUSETTS, ASSIGNOR TO THE WALKER & PRATT MANUFACTURING COMPANY, OF BOSTON, MASSACHUSETTS.

URN.

SPECIFICATION forming part of Letters Patent No. 642,322, dated January 30, 1900.

Application filed September 25, 1899. Serial No. 731,555. (No model.)

*To all whom it may concern:*

Be it known that I, FRED D. GODDARD, a citizen of the United States, residing at Everett, county of Middlesex, State of Massachusetts, have invented an Improvement in Urns, of which the following description, in connection with the accompanying drawings, is a specification, like letters and numerals on the drawings representing like parts.

This invention relates to an urn primarily intended for coffee, though it is capable of other uses, and it includes a fundamental and advantageous feature, a simple and convenient embodiment of which is illustrated and will hereinafter be described.

In making coffee and to secure the essence and strength thereof it is essential that the water be at least at the boiling-point when poured over the grounds, as water at a lower temperature than boiling will give the product an insipid taste. By my improved urn, however, the construction is such that it is not possible for the water to enter the coffee vessel or receptacle until it has reached the boiling-point.

My improved device in the present case involves a coffee vessel, a water vessel, means for effecting the supply of boiling water from the last-mentioned to the first-mentioned vessel, and means whereby the water is prevented from such action until it reaches a predetermined temperature, which in the present case is the boiling-point, and the several parts comprising the combination set forth may be of any character.

In the drawings, Figure 1 is a side elevation of an urn constructed in accordance with my invention in a simple embodiment thereof. Fig. 2 is a vertical central section of the urn looking toward the left, and Fig. 3 is a sectional plan view of the valve mechanism.

The urn illustrated in Figs. 1 and 2 of the drawings consists of two main sections, as 12 and 13, generally formed wholly from metal and nickeled or otherwise ornamented upon the outer faces thereof, and the upper section fits telescopically within the lower one, and both of them are of substantially cylindrical shape. The lower section 12 of the urn is provided with a series of depending legs, as 14, adapted to rest upon a suitable support, and it incloses the vessel or chamber for containing the water to be boiled, said vessel or chamber being denoted by V. In the present case the body of the lower cylindrical section of the urn constitutes the body of the water-containing vessel, while the top and bottom of the latter are denoted, respectively, by 15 and 16. The water within the vessel V may be heated in any suitable manner, either by a gas or hydrocarbon flame, and the boiling water is forced from such vessel by the pressure of the steam created therein upward through a suitable pipe or conduit into the coffee vessel or chamber V'.

The pipe for conducting the boiling water is denoted by P, and it is straight substantially its entire length, it passing snugly through an opening in the top 15 of the water vessel and having its inlet or receiving end 17 in proximity to the bottom 16 of the water vessel. The coffee vessel V' is separated from the inner wall of the cylindrical section of the urn by a space of sufficient area as to permit the circulation of enough steam when the water is cut off from the pipe P to maintain the contents of said coffee vessel at a proper heat. The upper end of the pipe is provided with a curved neck 18, the discharge end of which is located over the foraminous spreader S. The top 19 of the vessel V' has a circular and comparatively large opening 20 to receive the spreader S. The spreader is shown as being of substantially conical shape and is provided along its upper edge with the annular rim or flange 21, adapted to rest upon the top of the vessel V'. The coffee vessel or receptacle V' is removably mounted upon the spider or skeleton 22, secured to the inner wall of the lower section of the urn just above the top of the water vessel.

The urn is provided with a detachable cap, as C', fitted within the upper part 13 thereof and which can be taken from place to obtain access to the coffee vessel either for the purpose of cleaning the latter or providing it with a supply of coffee. The urn is provided near its lower side with a faucet 25 in communication with the water vessel V, by means of which any part of the contents of the latter can be drawn off.

A casting is shown at C sustained upon the top of the water vessel and provided with a transverse vent or port T, the peculiar purpose of which will hereinafter appear.

The lower section of the urn carries a glass water-gage G in communication with the vessel V, by which the height of the water in the latter can be determined and from which it can be ascertained whether the water within the same is boiling. A second gage G' is represented in the drawings, and it is in communication with the coffee vessel V', by which the height of the coffee (liquid) can be seen.

The urn is provided with a faucet 26 in communication with the coffee vessel V', by which the liquid coffee can be drawn off from such vessel.

The construction previously described is substantially that of a well-known type of urn, and hence I have not illustrated with detail certain of the parts, nor have I deemed it necessary to illustrate any particular kind of burner for heating the water in the vessel. In the urns now in use when a flame is started it will create steam, and this steam or vapor will develop sufficient pressure to force the water up through the pipe P into the coffee vessel before the water boils, and this, as is clearly evident, is not desirable, for the water when under the boiling-point cannot extract the full strength of the coffee. By my improvements, however, it is impossible for the water to pass from the water vessel to the coffee vessel until the boiling-point has been reached.

The casting C to which I have previously referred has a lateral bore 30 extending into the port T and opening into the upper side of the lower section of the urn above the top or wall 15. The lower section 12 is provided at its top at a convenient point with the lip 31, through which water can be poured, and upon the top 15 passing through the bore 30 and transverse port T in the casting C into the vessel V, and the gage G will indicate at once when the proper amount of water has been supplied. The casting C, having the transverse port T in line with the vent 35 in the top 15, is secured to said top and is provided longitudinally thereof with a chamber or recess 36 to receive the regulating-valve R, said valve being adapted to move across the transverse port 35, for a purpose that will hereinafter appear. The valve R is provided with the screw-threaded stem 37, extending through the lower part of the urn and also through the nut or block 38, secured thereto, said stem having at its extreme outer end the hand-wheel 39, by which it can be operated to move the valve back and forth. The valve R, it will be seen upon inspection of Figs. 2 and 3, has a port or vent 40 extending depthwise through the same and of less diameter than the transverse port T. In the present case I have provided means for reducing the area, but at no time wholly closing the vent 35 in the water or boiling vessel.

When coffee is to be made, the slide-valve R will be closed, thereby bringing the transverse port or vent 40 thereof into line with the transverse vent or port T in the casting or valve-carrier C, and consequently with the vent 35 in the water vessel. The port or vent 40 in the valve R is of diametrically less area than the port T and vent 35. Water having been previously supplied to the vessel V and the requisite quantity of coffee having been placed in the vessel V', the burner (not shown) under the vessel V will be lighted. When a temperature of about 180° has been reached, this would be sufficient, if it were not for the partially-opened vent 35, to force the water into the tube and from thence into the vessel V'. This partially-opened vent, however, permits the escape of such initially-created steam or vapor, and this escape of the vapor will continue until the water commences to boil, the opening in the valve R being of sufficient size to cause this peculiarity. The boiling-point will be reached very shortly after the primary creation of the steam and the steam will be formed so rapidly that it cannot escape through the small orifice, but expands and forces the boiling water therefrom through the pipe P and from the latter over the spreader, from which it trickles over the coffee. When the vessel V' has been supplied with the proper or predetermined quantity of boiling water, as the gage G will indicate, the valve R will be opened wide, thereby permitting the escape of the steam from the vessel V through the vent 35, which is then uncovered, and as the steam passes from the vessel V it cannot effect the elevation of boiling water through the pipe P. The steam, therefore, that passes through the vent 35 fills the space between the vessel V' and the upper section 13 of the urn, thereby retaining the heat of the liquid coffee after the supply of boiling water has been shut off.

Upon an inspection of the drawings it will be seen that the wall 15 separates the urn transversely into two compartments, in the lower of which the water-chamber is contained, while the upper one incases the coffee-receptacle, and the vent 35 affords a communication between the two compartments, so that boiling water can pass from the water-chamber, through said vent, into the upper compartment for the purpose of heating the coffee in the vessel when the feed of the boiling water to said vessel is stopped, as previously set forth. The construction previously set forth therefore absolutely prevents the supply of any water other than boiling to the coffee, and it also prevents any possibility of explosion of the water chamber or vessel V, as an escape for the steam is always provided, the size of the opening of course depending upon whether the water is being supplied to the upper vessel or not.

The invention is not limited to the precise details set forth, for these may be variously modified within the scope of the appended claims.

Having fully described my invention, what I claim as new, and desire to secure by Letters Patent, is—

1. An urn having a wall extending transversely across the interior thereof and separating the same into two compartments, and said wall having a vent affording communication between the compartments and the lower one having a hot-water chamber, a coffee vessel in which the coffee and boiling water are mixed to produce the liquid coffee, and from which said liquid coffee is drawn, in the upper compartment, and said vent being located below the upper edge of the coffee vessel, and a pipe for conveying boiling water from said hot-water compartment to the coffee vessel.

2. An urn having a wall extending transversely across the interior thereof and separating the same into two compartments, said wall having a vent affording communication between the compartments and the lower one having a hot-water chamber, a coffee vessel in which the coffee and boiling water are mixed to produce the liquid coffee, and from which said liquid coffee is drawn, in the upper compartment, and said vent being located below the upper edge of the coffee vessel, a pipe for conveying boiling water from said hot-water compartment to the coffee vessel, and a valve for controlling said vent.

3. An urn having a wall extending transversely across the interior thereof and separating the same into two compartments, said wall having a vent affording communication between the compartments and the lower one having a hot-water chamber, a coffee vessel located in the upper compartment, a pipe for conveying boiling water from said hot-water compartment to the coffee vessel, and a valve controlling said vent and having a port of less area than the vent.

4. An apparatus of the class specified including a coffee vessel, a water vessel having a vent, means for effecting the supply of boiling water to the coffee vessel from the water vessel, a valve-carrier provided with a port in communication with said vent, and a valve located to control said vent and having a port of less area than said vent.

5. An apparatus of the class specified including a coffee vessel, a water vessel having a vent, means for conducting boiling water from the water vessel to the coffee vessel and a valve controlling said vent and having a port of less area than the vent.

6. An urn including a coffee vessel, a water vessel having a vent, means for conducting boiling water from the water vessel to the coffee vessel, and a valve controlling said vent and having a port of less area than the vent, the valve being provided with a stem projecting through the wall of the urn and equipped with an actuating device.

In testimony whereof I have signed my name to this specification in the presence of two subscribing witnesses.

FRED D. GODDARD.

Witnesses:
HEATH SUTHERLAND,
GEO. W. GREGORY.